C. D. RAFFERTY.
LOCOMOTIVE VALVE SETTING MACHINE.
APPLICATION FILED SEPT. 6, 1916.
1,225,490.
Patented May 8, 1917.
7 SHEETS—SHEET 1.
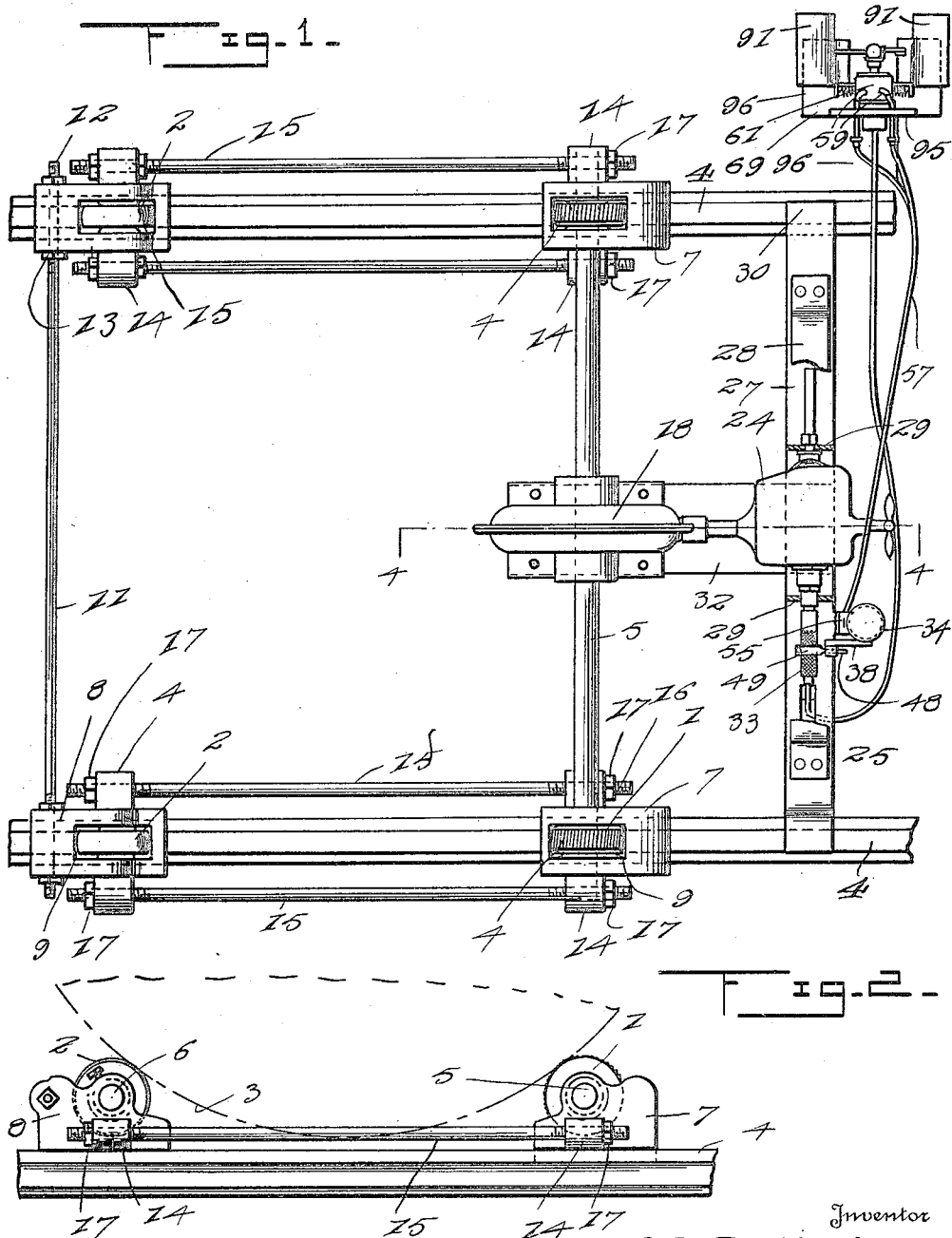

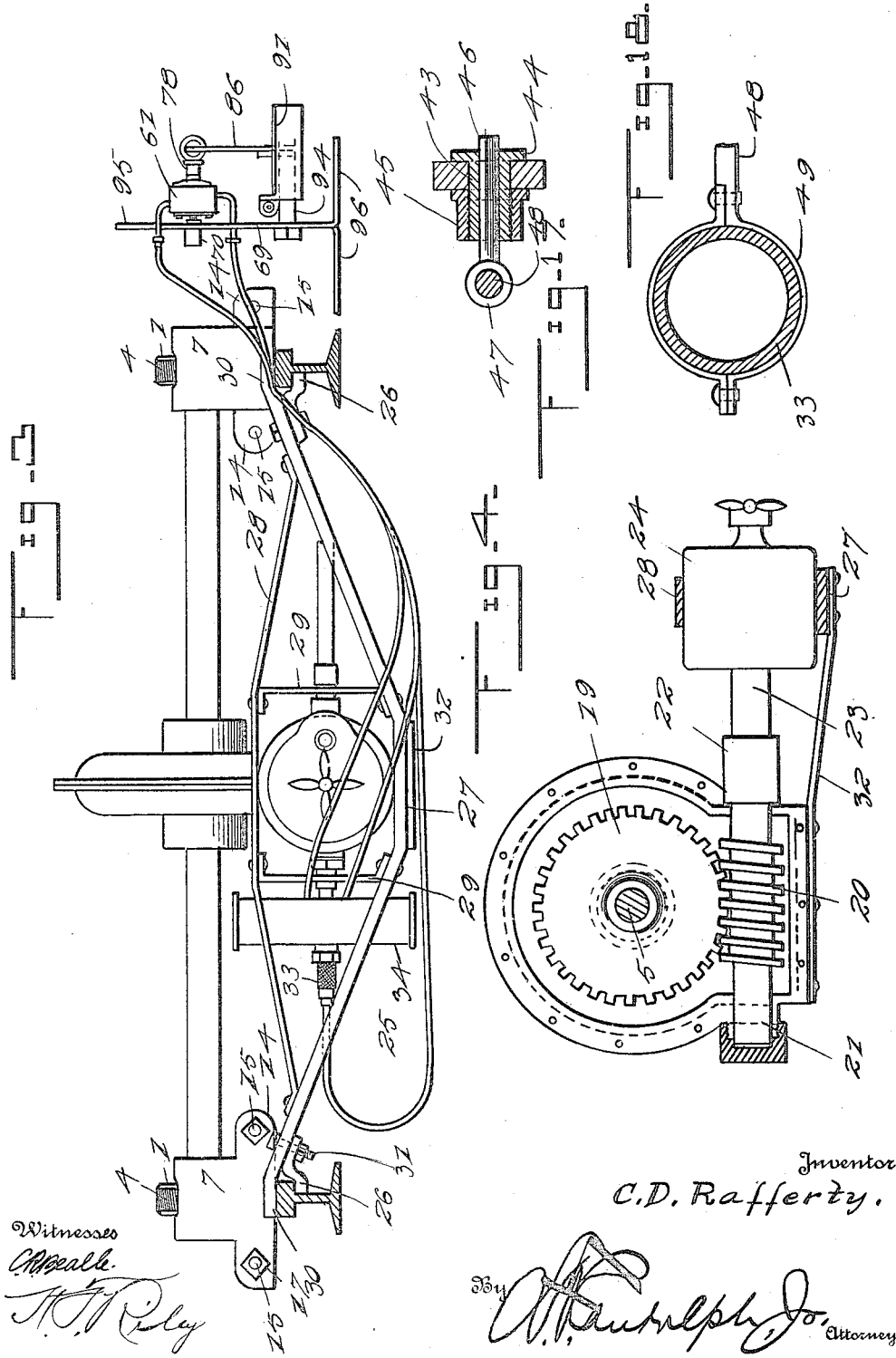

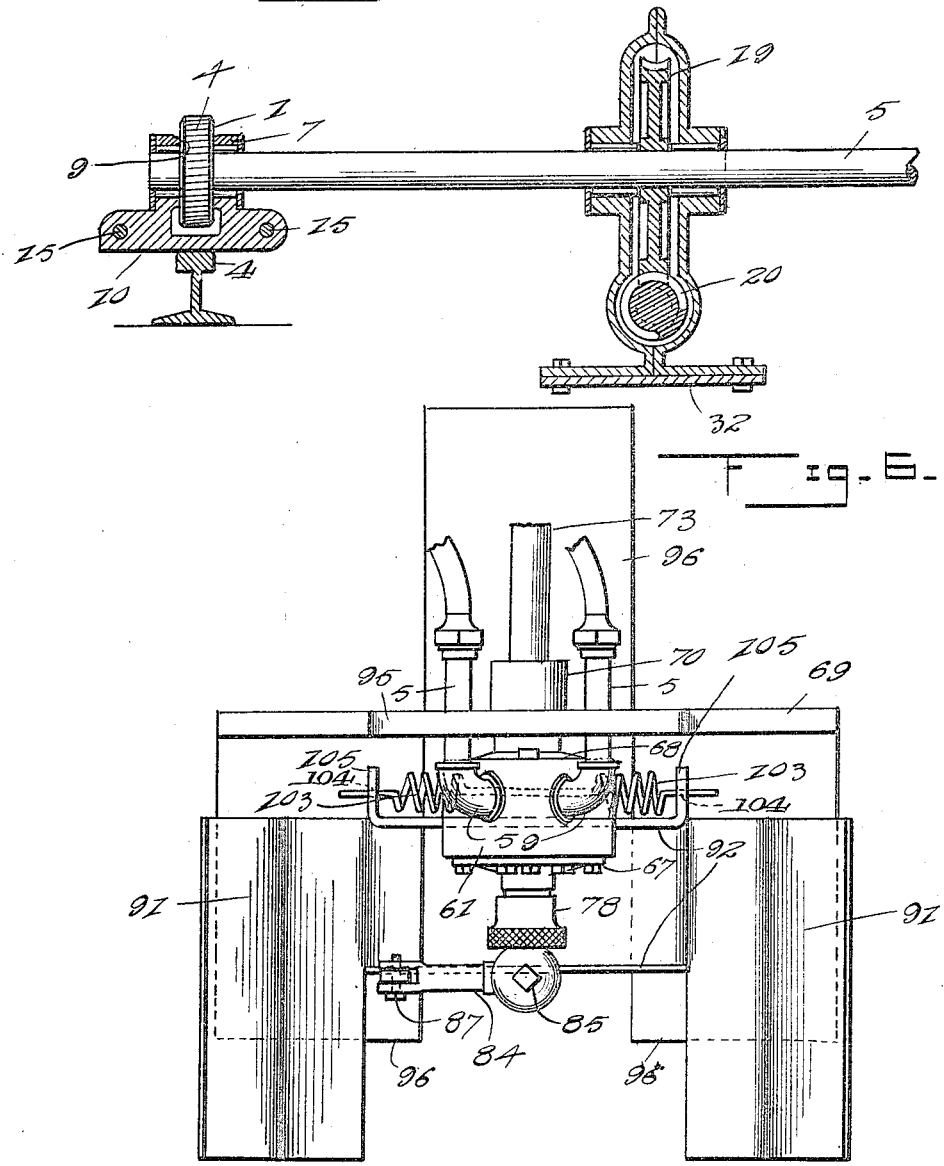

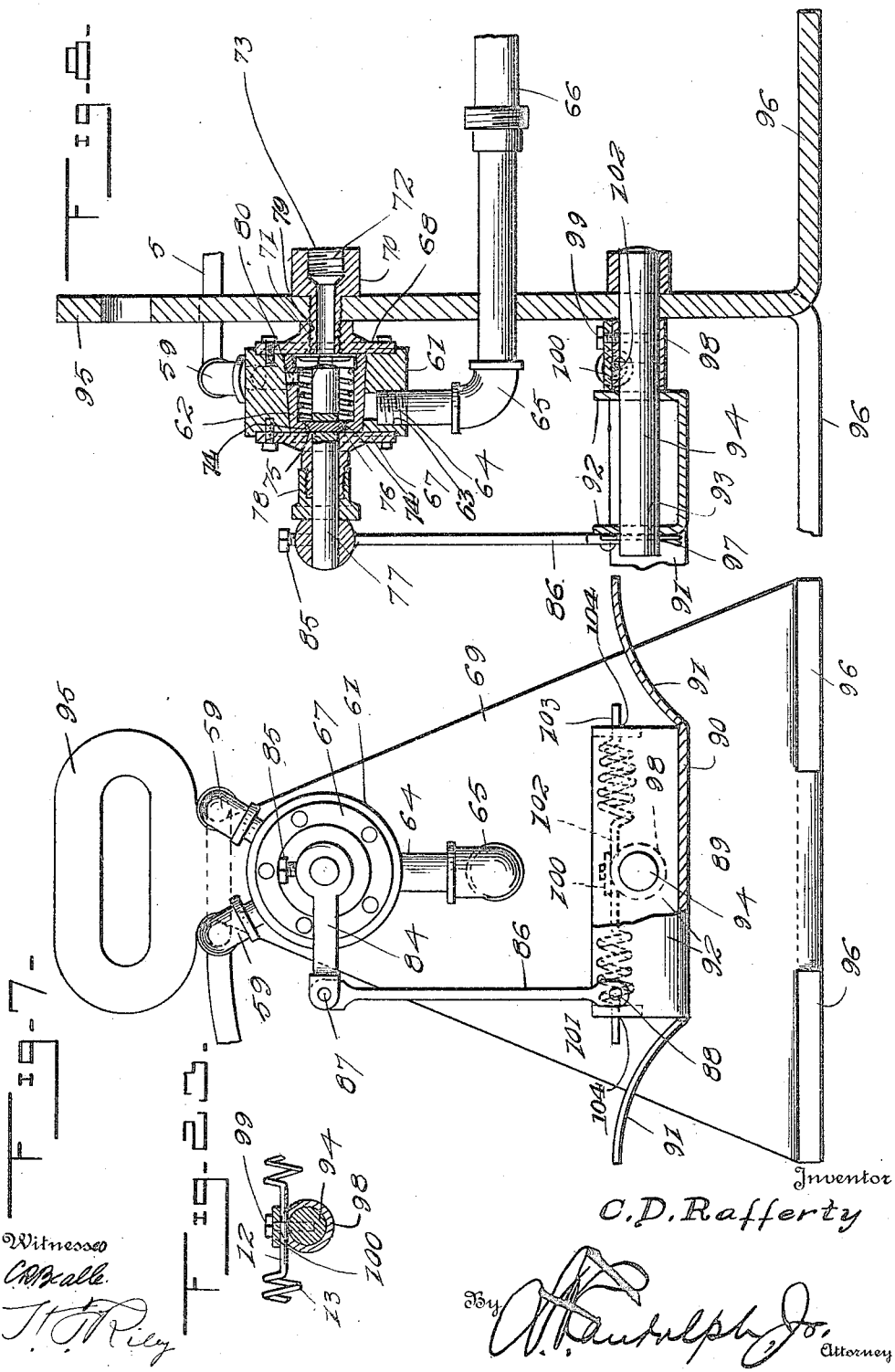

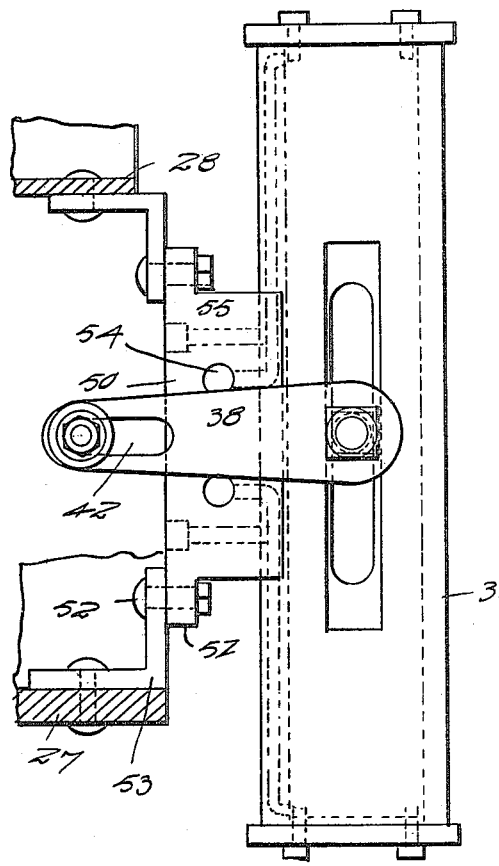
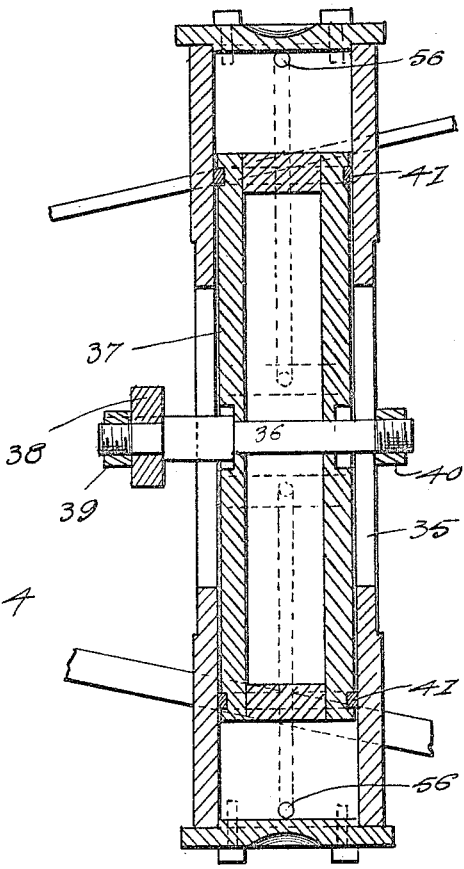
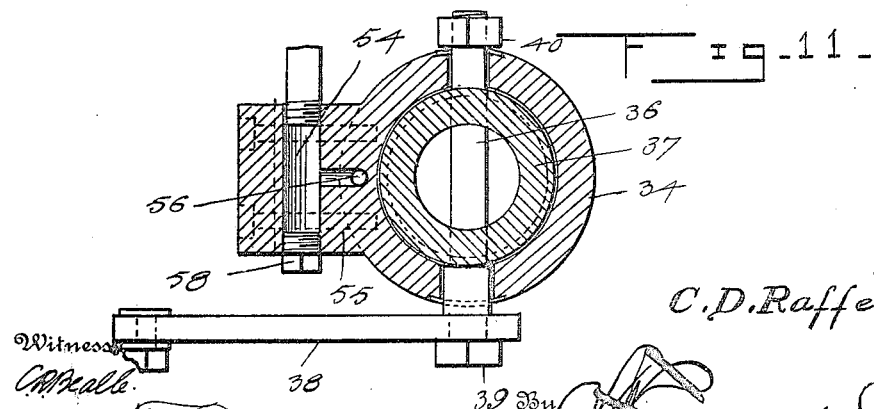

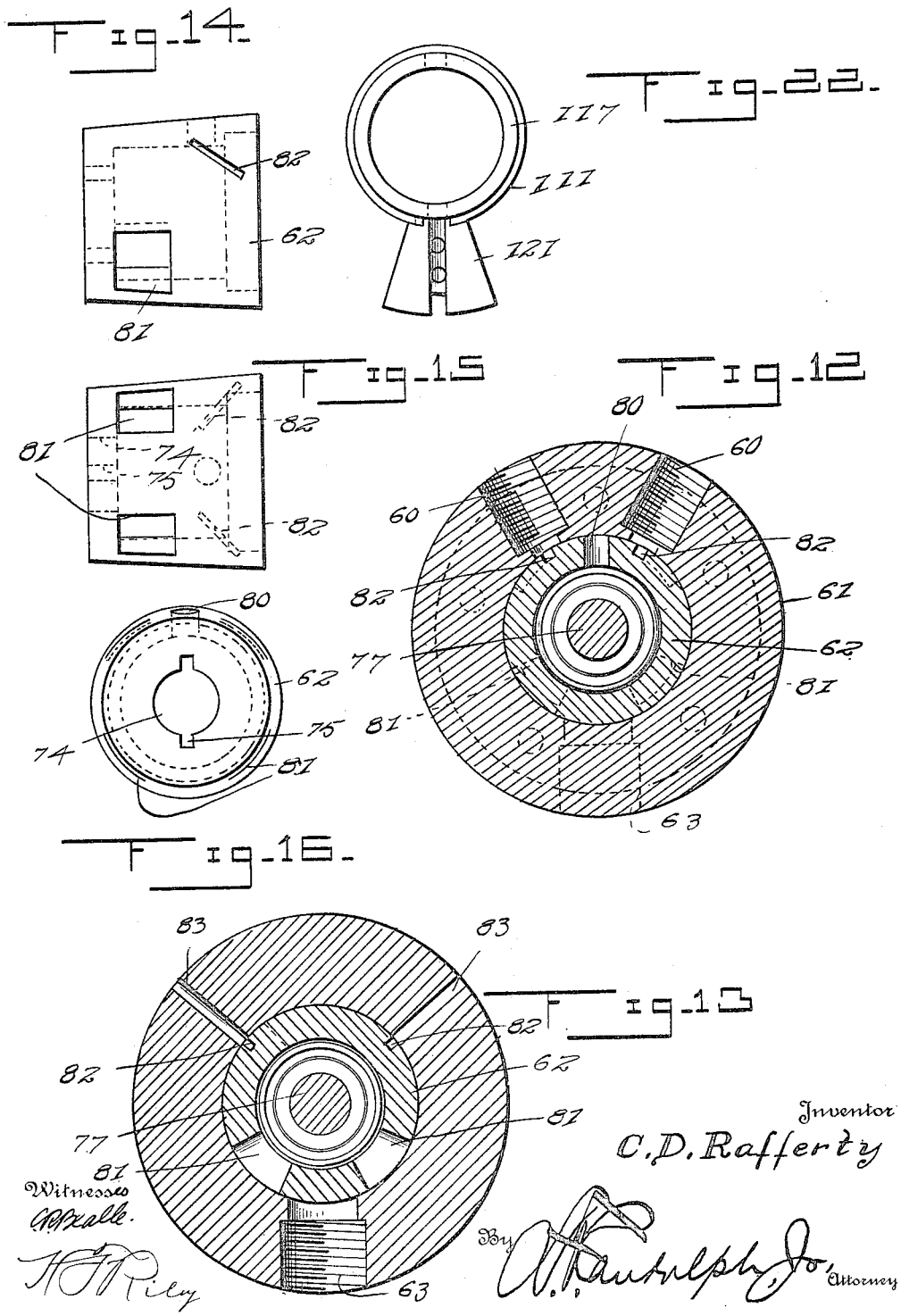

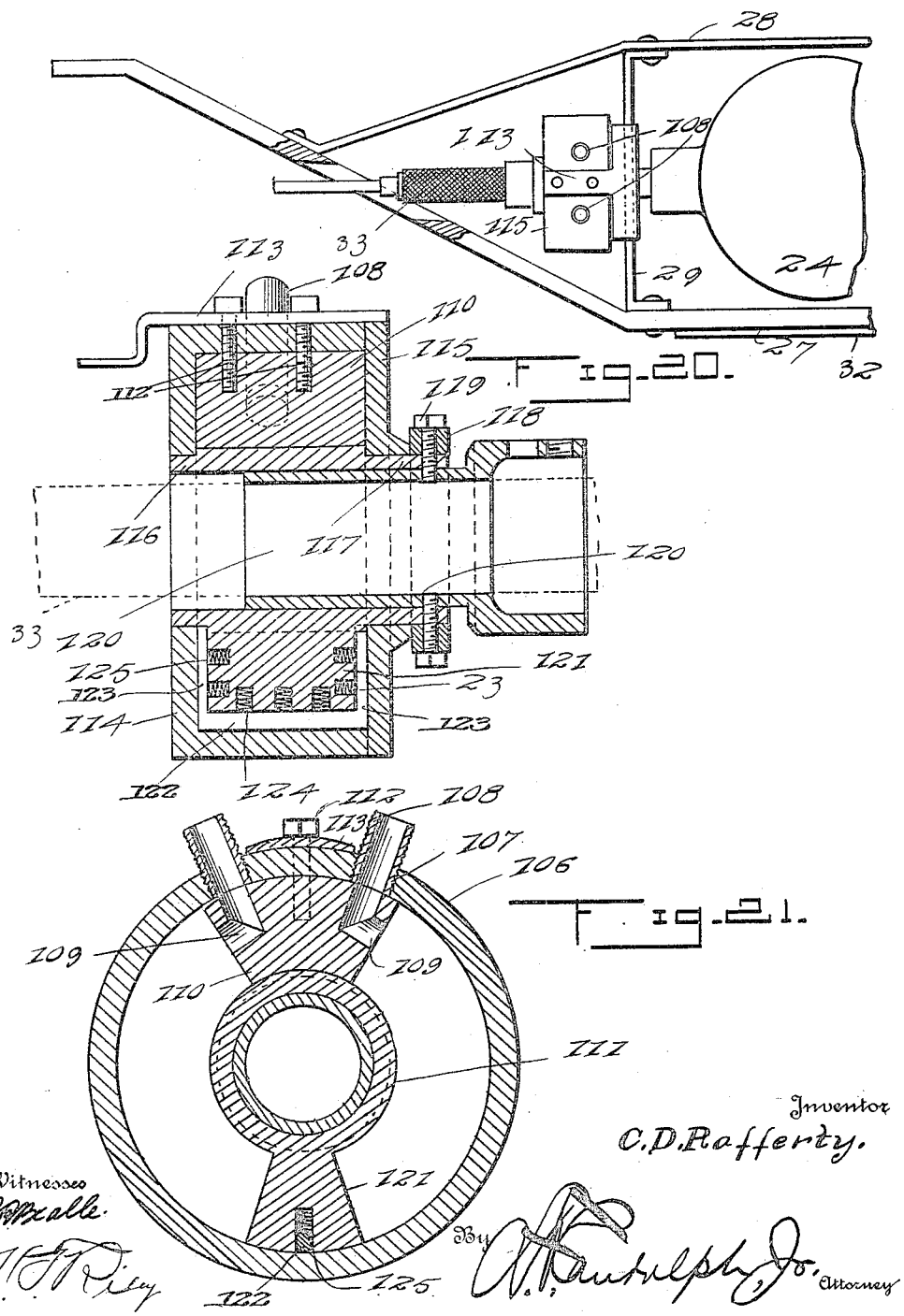

UNITED STATES PATENT OFFICE.

CHARLES D. RAFFERTY, OF MIDDLEPORT, OHIO.

LOCOMOTIVE-VALVE-SETTING MACHINE.

1,225,490.     Specification of Letters Patent.     Patented May 8, 1917.

Application filed September 6, 1916. Serial No. 118,733.

*To all whom it may concern:*

Be it known that I, CHARLES D. RAFFERTY, a citizen of the United States, residing at Middleport, in the county of Meigs and State of Ohio, have invented certain new and useful Improvements in Locomotive-Valve-Setting Machines; and I do hereby declare the following to be a full, clear, and exact description of the invention, such as will enable others skilled in the art to which it appertains to make and use the same.

The invention relates to a locomotive valve setting machine.

The object of the present invention is to provide a simple, practical and comparatively inexpensive locomotive valve setting machine of strong and durable construction capable of easy operation and adapted to enable the treads of the driving wheels of a locomotive to be elevated above the heads of the rails and rotated either forwardly or rearwardly for valve setting operations.

A further object of the invention is to provide a portable one man locomotive valve setting machine capable of being readily arranged over a pit and of being easily removed and transferred from one pit to another and equipped with means for detachably engaging the rails whereby it is securely clamped in position.

Another object of the invention is to provide a locomotive valve setting machine equipped with controlling means adapted to be operated at a convenient point from the pit and at either side of a locomotive and by the use of the foot leaving the hands free.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawings

Figure 1 is a plan view of a locomotive valve setting machine constructed in accordance with this invention, Fig. 2 is a side elevation of a portion of the same, Fig. 3 is an end elevation of the machine, the track being in section, Fig. 4 is a longitudinal sectional view on the line 4—4 of Fig. 1, Fig. 5 is a transverse sectional view on the line 5—5 of Fig. 1, Fig. 6 is a plan view of the foot control, Fig. 7 is a front elevation of the foot control partly in section, Fig. 8 is a central vertical longitudinal sectional view of the foot control, Fig. 9 is a side elevation partly in section, illustrating the construction of the throttle actuating device.

Fig. 10 is a vertical longitudinal sectional view of the same,

Fig. 11 is a horizontal sectional view of the throttle actuating device,

Figs. 12 and 13 are transverse sectional views of the valve of the foot control, Figs. 14 to 16 inclusive are detail views of the rotary valve member, Figs. 17 and 18 are detail views illustrating the construction of the connection between the motor throttle and the actuating device therefor, Fig. 19 is a detail view illustrating another form of throttle actuating device, Fig. 20 is a sectional view of the same taken longitudinally of the throttle, Fig. 21 is a transverse sectional view of the throttle actuating device shown in Figs. 19 and 20, Fig. 22 is a detail view of the piston of the same.

Fig. 23 is a detail view illustrating the construction and arrangement of the spring of the foot control.

Like numerals of reference designate corresponding parts in the several figures of the drawings.

In the accompanying drawings in which is illustrated the preferred embodiment of the invention, the locomotive valve setting machine comprises in its construction, front and rear driving wheels supporting and actuating rollers 1 and 2 arranged in pairs and designed to be placed beneath the opposite driving wheels of a locomotive and to be drawn together by the means hereinafter described for lifting the treads of the driving wheels 3 clear of the heads of the rails 4 for enabling the driving wheels to be rotated during the valve setting operation. The front or driving rollers 1, which are provided with corrugated or otherwise roughened peripheries 4a to prevent the driving wheels of a locomotive from slipping are keyed or otherwise fixed to a transverse shaft 5 and the rear rollers 2 which are preferably provided with smooth peripheries as shown are mounted on short transverse shafts 6. The shafts 5 and 6 are mounted in spaced bearings of front and rear bearing blocks 7 and 8 which are provided with slots or openings 9 for the reception of the front and rear rollers 1 and 2. The front and rear bearing blocks have flat lower faces 10 and are adapted to rest upon the heads of the rails and the rear bearing blocks are connected by a transverse rod 11 having threaded terminals 12 piercing the rear bearing blocks and equipped with nuts 13 arranged in pairs and located at the inner and outer faces of the rear bearing blocks and holding the same again relative transverse movement. The front and rear bearing blocks 7 and 8 are also provided with laterally extending lugs 14, through which extend longitudinal connecting rods 15 arranged in pairs and located at opposite sides of the rails and equipped with threaded terminal portions 16 receiving nuts 17 located at the outer faces of the lugs and adapted to be operated to draw the bearing blocks toward each other for elevating the driving wheels of a locomotive to clear the same of the rails 4. Any other suitable means, however, may be employed for this purpose and it will be apparent that when the bearing blocks are drawn together the front and rear rollers will engage the tread of the driving wheels of the locomotive and will lift the driving wheels clear of the heads of the rails as illustrated in dotted lines in Fig. 2 of the drawings.

This will enable the driving wheels to be rotated freely in either direction by the means hereinafter described.

The front transverse shaft 5, which coacts with the rear transverse rod 11 in spacing the bearing blocks extends through a central gear case 18 preferably divided longitudinally as shown, and housing a worm wheel 19 and a worm 20. The worm wheel 19 is suitably fixed to the transverse shaft 5 and the worm is mounted on a central longitudinal shaft 21 and is located beneath the worm wheel 19 in meshing relation with the same. The gear case which conforms to the configuration of the worm gearing is designed to be provided with suitable anti-friction bearing devices for reducing the friction to a minimum and as anti-friction devices may be of any desired construction, a detail description thereof is deemed unnecessary. The front end of the longitudinal driving shaft 21 is connected by a coupling 22 with the shaft 23 of a motor 24 of the pneumatically actuated rotary type mounted in a transversely disposed supporting frame 25 extending across the space between the rail 4 and equipped with clamps 26 for engaging the same. The transverse supporting frame consists of a main truss bar or member 27, an arched bar 28 and spaced vertical struts or braces 29 located between the bars 27 and 28 and located at opposite sides of the center of the frame as clearly illustrated in Fig. 3 of the drawings. The upper and lower truss bars or members 28 and 27 consist of central horizontal portions and oppositely inclined terminal portions and are secured together at the terminals of the upper truss bar or member, the terminal portions of the lower truss bar or member being extended beyond the upper bar 28 and provided with horizontal terminals 30 which rest upon the heads of the rails 4. The clamps 26 which consist of plates secured by bolts 31 to the lower faces of the terminal portions of the bottom bar 27 and have angularly bent engaging portions extending beneath the heads of the rails at the inner side thereof and engaging the same. By this construction the transverse supporting frame is firmly clamped to the rails. This construction will enable the machine to be readily secured to a track over a pit or any other convenient place. The gear case is connected with the frame by a brace 32 consisting of a plate bolted or otherwise secured to the gear case and to the said transverse frame and rigidly connecting the parts and maintaining the same in proper alinement.

The pneumatically actuated motor which is suitably secured within the transverse supporting frame, is equipped with a rotary throttle 33 of the usual construction and the throttle actuating mechanism comprises a vertical cylinder provided at opposite sides with vertical guide slots 35 for a cross head 36 of a vertically movable cylindrical piston 37. The cross head 36 extends centrally of the piston and projects from one side of the cylinder and it has squared portions 4 operating in the guide slots 35 and also to receive a reversing arm 38 and the terminals of the cross head are threaded for the reception of nuts 39 and 40, the nut 39 securing the reversing arm on the cross head. The piston which is provided at its terminals with suitable packing 41 is actuated by fluid pressure admitted to and exhausted from the ends of the cylinder by a foot control hereinafter described and the said arm is provided with a longitudinal slot 42 receiving an adjustable bearing sleeve 43 provided at one end with a head 44 and threaded at its opposite portion for the reception of a tubular nut 45. The tubular bearing sleeve which is adapted to be adjusted longitudinally of the slot 42 to vary the stroke of the throttle actuating device receives a pivot 46 swiveled in the adjustable bearing of the reversing arm and provided with a sliding sleeve 47 which is mounted on and is movable longitudinally of a finger 48 that is carried by the throttle of the pneumatically actuated motor. The finger 48 is secured to the throttle by a clamp 49 of sectional form as clearly illustrated in Fig. 18 of the drawings and when the piston of the vertical cylinder is in a central position, the finger 48 is horizontal. When fluid pressure is admitted to the upper end of the cylinder 34, the piston is moved downwardly and the finger is carried downwardly by the arm 38 and the motor is caused to rotate forwardly and when the reversing arm is moved upwardly from a central position, the throttle of the motor will be operated to run the motor backwardly. The slidable connection between the finger and the pivot which is adapted to rotate in the swiveled bearing of the reversing arm, permits the throttle to rotate when the piston is moved upwardly or downwardly.

The cylinder is provided with a central enlargement 50 preferably formed integral with the cylinder and having upper and lower lugs 51 which are pierced by bolts 52 of angles or knees 53 that are bolted or otherwise secured to the upper and lower bars of the transverse supporting frame. By this construction the vertical cylinder is mounted on the frame which carries the motor and to which the gear case is connected. The enlargement 51 is provided with threaded sockets 54 communicating with passages 55 extending to the top and bottom of the cylinder 34 and having their inner terminals 56 constituting ports for the admission and exhaust of fluid pressure from the cylinder. The enlargement preferably consists of a block bolted or otherwise secured to the cylinder and the sockets 54 which are threaded for the reception of flexible tubes 57 are preferably formed by transverse bores which are closed at one end by plugs 58. The bores are centrally connected with the passages that extend to the ends of the cylinder.

The flexible tubes 57 extend to and have terminal elbows 59 which are tapped into opposite upper openings 60 of a cylindrical casing 61 of a rotary valve member 62 of a foot operated controlling valve. The cylindrical casing 61 of the controlling valve is also provided at the bottom with a threaded opening 63 for the reception of the threaded terminal 64 of an elbow 65, of a flexible tube 66 which is connected at the other end with the throttle of the pneumatic motor, the valve of the foot control being adapted to control the admission of fluid pressure to the motor and also to the vertical cylinder for operating the throttle of the motor.

The cylindrical casing 61 of the controlling valve is provided with front and rear heads 67 and 68 and the controlling valve is mounted on a standard or support 69 by a coupling member 70 extending through the standard or upright portion 69 and threaded into the rear cylinder head 68. The rear cylinder or cylindrical casing head 68 is provided with an enlargement having a central threaded opening 71 for the reception of the coupling member 70 which is provided with a threaded socket 72 to receive a flexible tube 73 for supplying fluid pressure to the locomotive valve setting machine. The rotary valve member is tapered and it is open at the rear end and provided at the front end with a wall having an opening 74 and provided at opposite sides thereof with notches 75 for the reception of the terminal portions of a key 76 extending through a stem 77 and interlocking the rotary valve member with the said stem. The stem 77 extends forwardly through the front head which is equipped with a stuffing box 78. The rotary valve member which tapers forwardly is urged forwardly in tight engagement with the walls of the cylindrical casing by a coiled spring 79 and the said cylindrical casing is interiorly tapered to fit the rotary valve member and it is provided at the top with an inlet port 80 and it has a pair of inlet ports 81 located at opposite sides of its bottom portion as clearly illustrated in Fig. 13 of the drawings. When the rotary valve member is in its normal position, the upper inlet port is located between the upper ports or openings 60 and the lower ports 81 are located at opposite sides of the bottom port or opening 63. The rotary valve member is also provided with opposite grooves 82 formed in the exterior face of the rotary valve member and diverging rearwardly and connecting the openings or ports 60 with exhaust passages or ports 83 when the said rotary valve member is in its normal or neutral position. This will permit the fluid pressure from the vertical throttle actuating cylinder to exhaust through the said grooves 82 and the exhaust opening 83. When the rotary valve member is turned in one direction, the upper port 80 is carried into register with one of the openings 60 and air is admitted to one end of the cylinder of the throttle actuating device and one of the openings 81 is carried into register or partial register with the bottom opening 63 for admitting fluid pressure to the pipe which is connected with the throttle lever of the pneumatic motor. When the valve is fully opened and the throttle is moved to the limit of its movement in one direction, the upper port or opening 80 is carried beyond the coacting opening 60 so that the throttle will be held in its open position and the entire fluid pressure from the supply pipe will be admitted to the motor for actuating the latter.

The outer front end of the stem 77 carries a laterally projecting arm 84 which has a head or enlargement at its inner end secured to the outer end of the stem 77 by a set screw 85. The head or inner enlarged portion of the arm 84 is provided with an opening to receive the stem and the set screw 85 is preferably provided for clamping the stem but any other suitable means may of course be employed for securing the arm 84 to the said stem 77. The outer end of the arm 84 is bifurcated to receive the upper end of a link 86 pivoted by a pin 87 or other suitable fastening device to the arm 84 and pivoted at its lower end by a screw 88 or other suitable fastening device to a double treadle 89. The double treadle 89 consists of a central horizontal portion 90 provided at opposite sides with projecting foot plates 91 curving upwardly and outwardly and adapted to be depressed by the foot of the operator. The treadle is also provided at the central portion with a pair of upwardly extending transversely disposed flanges 92 having alined openings 93 and mounted on a horizontal pivot 94 which is suitably secured to and extends forwardly from the standard or upright portion 69 of the support on which the controlling valve is mounted. The support which is portable and which is provided at its upper end with a hand hold 95 has a suitable base 96 extending forwardly and rearwardly from the upright or standard 69 and adapted to rest upon the floor or other supporting surface. The treadle is secured on the horizontal pivot 94 by a cotter pin 97 or other suitable fastening device and it is spaced from the standard or upright portion 69 by a sleeve 98 fixed to the said pivot 94 by a screw 99 or other suitable fastening device which also fastens a clamping plate 100 to the top of the said sleeve 98. The clamping plate 100 centrally engages a spring 101 consisting of a central portion 102, side coils 103 and terminal portions which extend through perforations 104 of opposite flanges 105 formed integral with and extending rearwardly from one of the transverse flanges 92. The straight terminal portions of the spring 101 are adapted to slide in the perforations of the opposite rearwardly projecting flanges 105 and when the treadle is released by the operator, the spring will automatically return the treadle to a horizontal or neutral position and permit the fluid pressure to exhaust from the cylinder. The portable foot control comprising the support, the controlling valve and the treadle connection with the same is adapted to be readily transferred from one place or point to another and it will enable the locomotive valve setting machine to be operated entirely by the foot.

In Figs. 19 to 22 inclusive is illustrated another form of throttle actuating device comprising in its construction, a cylindrical casing 106 provided with inlet openings 107 preferably threaded for the reception of nipples 108 for the connection of the flexible tubes which are connected with the foot control, and the said openings 107 communicate with ports 109 of a block 110 arranged within and secured to the cylindrical casing 106 and fitted against a sleeve 111, the block 110 which is substantially sector shaped has curved inner and outer faces to fit the sleeve 111 and the interior of the cylindrical casing 106 and it is secured rigidly to the said casing by screws 112 which also fasten a spring 113 to the cylindrical casing. The cylindrical casing 106 is provided at one end with an integral head 114 and it has a removable head 115 at the other end. The sleeve 111 has reduced terminal portions 116 and 117 which fit in openings in the heads 114 and 115 and form shoulders for engaging the inner faces of the same and the said reduced portion 117 is extended beyond the head 115 for the reception of a set collar 118 which is secured to the extended portion 117 by screws 119 and the latter extend through the said reduced portion 117 of the sleeve 111 and into a bushing 120. The screws project through the bushing 120 and are adapted to engage the throttle as illustrated in dotted lines in Fig. 20 of the drawings. The sleeve 111 constitutes the body portion of the tubular piston which has a tapered approximately sector shaped head 121 formed integral with the sleeve 111 and fitted against the interior of the cylindrical casing and located at a point diametrically opposite the segmental block 110 when the treadle control is in its normal or neutral position. The foot control is adapted to be operated as hereinbefore described to admit fluid pressure to either side of the piston head 121 which will be rotated and which will carry with it the throttle of the pneumatic motor. By this construction the throttle is directly connected with the piston of the cylinder and it may be rotated in either direction for causing the motor to run either forwardly or backwardly and at the desired speed. The piston may be provided with any suitable packing and in Fig. 20 of the drawings, the packing consists of strips 122 and 123 located at the end and side faces of the piston 121 and urged into engagement with the interior of the cylindrical casing.

The cylinder is mounted on the throttle of the motor and it is held against rotary movement by the spring 113 which is preferably substantially T-shaped as clearly shown in Fig. 19 of the drawings to provide a stem and opposite resilient portions which fit against the adjacent brace or strut of the transverse supporting frame whereby the throttle operating device is cushioned as well as held against rotary movement.

With this one man operated valve setting machine, the valves are set without removing main and side rods from locomotive. To accomplish this feature, block between the driving spring ends and frame, or, between the bottom of driving boxes and pedestal braces. Measure from the rail to the frame on the four corners of locomotive and place jacks under front and back of engine. Raise sufficiently high to take weight off of driving boxes, and keep engine level with track, then place machine under engine and tighten rods on rollers until main drivers raise main journal to running fit in main bearing and clear rail; machine will then turn main driving wheels on rollers and pull all other wheels when oil is applied to tread of wheel to make them slip easily where they come in contact with rail. The above is accomplished with engines up to eighty tons weight, and still have plenty of reserve power. With heavier than eighty ton engines, the weight is taken off of main and intermediate wheels only, and the knuckle pins are removed from side rods back of main drivers and in front of intermediate drivers, machine will then pull main drivers on rollers and skid the intermediate drivers on rail, pulling side rod connecting main and intermediate drivers and skidding intermediate driver on rail, also pulling main rod, cross head, piston and all other running parts of locomotive regardless of size. By applying four rollers, two each front and back under each pair of wheels, same as driven rollers or idlers as shown on valve setting machine, all drivers can be turned with ease on engines of any size.

What is claimed is:—

1. A locomotive valve setting machine including spaced front and rear rotary elements arranged to engage and support the driving wheels of a locomotive, a transverse shaft connecting the front rotary element, a worm wheel mounted on the transverse shaft, a worm meshing with the worm wheel and a pneumatic motor connected with the worm for rotating the same.

2. A locomotive valve setting machine including spaced front and rear rotary elements arranged to engage and support the driving wheels of a locomotive, a transverse shaft connecting the front rotary element, a gear case, a worm wheel mounted on the transverse shaft and located within the gear case, a longitudinal shaft journaled in the gear case and having a worm meshing with the worm wheel, a motor having a shaft connected with the longitudinal shaft and bracing means connecting the gear case with the motor.

3. A locomotive valve setting machine including front and rear rotary elements arranged in pairs, a transverse shaft connected with one pair of the rotary elements, the latter being adapted to support the driving wheels of a locomotive, a gear case having bearings receiving the transverse shaft, a transversely disposed supporting frame arranged in spaced relation with the transverse shaft and having rail engaging means, a motor mounted on the transverse frame and connected with the transverse shaft and means for rigidly connecting the gear case with the transverse frame.

4. A locomotive valve setting machine including bearing blocks arranged in pairs and designed to be arranged upon the rails of a track, means for connecting the bearing blocks, rotary elements arranged in pairs and carried by the bearing blocks, a transverse shaft connecting one pair of the rotary elements, a gear case having bearings receiving the transverse shaft, a transverse frame arranged in spaced relation with the transverse shaft and provided with rail engaging means, a motor mounted on the transverse frame, and gearing connecting the motor with the transverse shaft.

5. A locomotive valve setting machine including bearing blocks arranged in pairs and designed to be arranged upon the rails of a track, means for connecting the bearing blocks, rotary elements arranged in pairs and carried by the bearing blocks, a transverse shaft connecting one pair of the rotary elements, a gear case having bearings receiving the transverse shaft, a transverse frame provided with rail engaging means, a motor mounted on the transverse frame, rigid bracing means connecting the gear case with the transverse frame, and gearing located within the gear case and connecting the transverse shaft with the motor.

6. A locomotive valve setting machine including spaced rotary elements arranged in pairs, and adapted to support the driving wheels of a locomotive, a transverse frame extending across the track and provided at its ends with rail clamping means, a motor carried by the frame, and gearing connecting the motor with the rotary elements.

7. A locomotive valve setting machine including spaced rotary elements arranged in pairs, and adapted to support the driving wheels of a locomotive, a transverse frame extending across the track and comprising a main truss bar having its ends arranged upon the tracks, rail clamps carried by the truss bar, an arched bar and strut members connecting the said bars, a motor mounted on the said frame and gearing connecting the motor with the rotary elements.

8. A locomotive valve setting machine including front and rear bearing blocks arranged in pairs, means for rigidly connecting the bearing blocks with one another, rotary elements carried by the bearing blocks and arranged to engage the driving wheels of a locomotive for supporting the same above the rails, a transverse shaft connecting one pair of the rotary elements, a gear case having bearings receiving the transverse shaft, a transverse frame comprising a main truss bar extending across the track and having terminal portions engaging the rails, rail clamps carried by the terminal portions of the said bar and coacting with the same to grip the rails, an arched bar secured at its terminals to the main truss bar, means for connecting the bars between the terminals thereof, a motor carried by the frame, gearing located within the said casing for connecting the motor with the transverse shaft, and means for rigidly connecting the gear case with the main truss bar of the transverse frame.

9. A locomotive valve setting machine including rotary elements arranged to engage the driving wheels of a locomotive, a rotary motor having a rotary throttle, means for connecting the motor with the said rotary elements, a cylinder having a reciprocatory piston, and means for connecting the piston with the rotary throttle of the said motor.

10. A locomotive valve setting machine including rotary elements arranged to engage the driving wheels of a locomotive, a rotary motor having a rotary throttle, means for connecting the motor with the said rotary elements, a cylinder having a reciprocatory piston, means for connecting the piston with the throttle comprising an arm connected with the said piston and carried by the same in the reciprocation thereof, a finger projecting from the throttle and a pivot mounted on the said arm and slidably connected with the said finger.

11. A locomotive valve setting machine including rotary elements arranged to engage and support the driving wheels of a locomotive, means for rotating the driving wheels including a motor connected with the said rotary elements and having a rotary throttle, a finger projecting from the throttle, a cylinder having a reciprocatory piston, an arm connected with the cylinder and carried by the same, and a pivot mounted on the said arm and having a sleeve slidably receiving the said finger.

12. A locomotive valve setting machine including rotary elements arranged to support the wheels of a locomotive, means for rotating the locomotive wheels comprising a motor connected with the rotary elements and having a rotary throttle, a cylinder, a piston reciprocating in the cylinder, an arm connected with the cylinder and having a longitudinal slot, a pivot operating in the slot, means for adjustably securing the pivot at different points along the slot, a finger projecting from the throttle and means for slidably connecting the said finger with the said pivot.

13. A locomotive valve setting machine including rotary elements arranged to support the driving wheels of a locomotive in an elevated position, a motor having a rotary throttle, means for connecting the motor with the rotary elements for rotating the driving wheels, a cylinder provided with opposite slots, a piston operating in the cylinder, a cross head carried by the piston and guided in the said slots, an arm connected with the cross head and means for connecting the arm with the rotary throttle for rotating the latter when the piston is reciprocated.

14. A locomotive valve setting machine including rotary elements arranged to support the driving wheels of a locomotive, a motor, having a rotary throttle, means for connecting the motor with the rotary elements, a cylinder, a piston operating in the cylinder, means for connecting the piston with the throttle and a valve for controlling the admission of fluid pressure to the cylinder and to the motor.

15. A locomotive valve setting machine including rotary elements arranged to support the driving wheels of a locomotive, a motor, having a rotary throttle, means for connecting the motor with the rotary elements, a cylinder, a rotary piston operating within the cylinder and arranged on and connected with the throttle of the motor and means for controlling the admission of fluid pressure to the said cylinder.

16. A locomotive valve setting machine including rotary elements arranged to support the driving wheels of a locomotive, a motor having a rotary throttle, means for connecting the motor with the rotary elements, a cylinder having spaced inlets, a piston comprising a tubular body and a head extending radially from the body, said body being arranged on the said throttle, and means for connecting the piston with the throttle.

17. A locomotive valve setting machine including rotary elements arranged to support the driving wheels of a locomotive, a motor having a rotary throttle, means for connecting the motor with the rotary elements, a cylinder having spaced inlets, a piston comprising a tubular body and a head extending radially from the body, said body being arranged on the said throttle, and a bushing surrounding the throttle and secured to the same and to the tubular portion of the said piston.

18. A locomotive valve setting machine including rotary elements adapted to support the driving wheels in an elevated position, a motor, means for connecting the motor with the rotary elements for actuating the driving wheels, a cylinder connected with the throttle of the motor, a rotary valve having spaced ports connected with the cylinder and a separate port connected with the motor and adapted to control the admission and exhaust of fluid pressure to the cylinder and the admission of fluid pressure to the said motor.

19. A locomotive valve setting machine including rotary elements adapted to support the driving wheels in an elevated position, a motor, means for connecting the motor with the rotary elements for actuating the driving wheels, a cylinder connected with the throttle of the motor, a rotary valve having spaced ports connected with the cylinder and a separate port connected with the motor and adapted to control the admission and exhaust of fluid pressure to the cylinder and the admission of fluid pressure to the said motor, an operating device connected with the valve and a spring for maintaining the operating device in a neutral position.

20. A locomotive valve setting machine including rotary elements adapted to support the driving wheels in an elevated position, a motor, means for connecting the motor with the rotary elements for actuating the driving wheels, a cylinder having a piston connected with the throttle of the motor, a valve having a rotary valve member and connected with the cylinder and with the motor, a treadle pivoted intermediate of its ends and connected with the rotary valve member, and a spring normally maintaining the valve in a closed position.

21. A locomotive valve setting machine including rotary elements adapted to support the driving wheels in an elevated position, a motor, means for connecting the motor with the rotary elements for actuating the driving wheels, a cylinder having a piston connected with the throttle of the motor, a valve having a rotary valve member and connected with the cylinder and with the motor, a foot treadle pivoted at an intermediate point and having opposite foot plates, a spring connected with the treadle for maintaining the same normally in substantially a horizontal position, an arm connected with the rotary member of the valve and means for connecting the treadle with the arm for permitting the treadle to move the arm in either direction.

22. A locomotive valve setting machine including rotary elements adapted to support the driving wheels in an elevated position, a motor, means for connecting the motor with the rotary elements for actuating the driving wheels, a cylinder having a piston connected with the throttle of a motor, a valve including a rotary element and having means for controlling the admission and exhaust of fluid pressure to the cylinder and the admission of fluid pressure to the said throttle, an arm connected with the rotary element of the valve, a horizontal pivot, a treadle pivoted intermediate of its ends by the said pivot and having opposite foot plates adapted to be depressed, means for connecting the treadle with the said arm, and a spring rigidly connected intermediate of its ends with the said pivot and having opposite coils connected with the treadle at opposite sides of the said pivot.

23. A locomotive valve setting machine including rotary elements adapted to support the driving wheels in an elevated position, a motor, means for connecting the motor with the rotary elements for actuating the driving wheels, a cylinder having a piston connected with the throttle of the motor, and a portable foot control comprising a stand, a valve mounted on the stand and including a rotary element and provided with means for controlling the admission and exhaust of fluid pressure to the cylinder and the admission of fluid pressure to the throttle of the motor, an arm connected with the rotary member, a treadle consisting of a body portion having spaced transverse flanges and provided with opposite foot plates, a pivot extending through the said transverse flanges, means for yieldably maintaining the treadle in a predetermined position, and means for connecting the treadle with the said arm.

24. A locomotive valve setting machine including rotary elements adapted to support the driving wheels in an elevated position, a motor, means for connecting the motor with the rotary elements for actuating the driving wheels, a cylinder having a piston connected with the throttle of the motor, and a controlling valve comprising a casing having a main inlet and provided with spaced upper openings and a central lower opening, flexible tubes connecting the upper openings with the cylinder, a separate flexible tube connecting the bottom opening with the throttle of the motor, a rotary valve member arranged within the casing and having an upper port operating in conjunction with the spaced upper openings and located between the same when the valve is closed, said rotary valve member being also provided with spaced lower ports located at opposite sides of the bottom opening when the valve is closed and means for operating the valve.

In testimony whereof I affix my signature in presence of two witnesses.

CHARLES D. RAFFERTY.

Witnesses:
GEORGE P. WORK,
MAYNARD L. DAVIS.

Copies of this patent may be obtained for five cents each, by addressing the "Commissioner of Patents, Washington, D. C."